United States Patent [19]

Wild et al.

[11] Patent Number: 5,684,139
[45] Date of Patent: Nov. 4, 1997

[54] DIRECT DISAZO DYESTUFFS

[75] Inventors: Peter Wild, Odenthal, Germany; Karin Hassenrück, Mt. Pleasant, S.C.; Frank-Michael Stöhr, Odenthal, Germany

[73] Assignee: Bayer Aktiengesellschaft, Leverkusen, Germany

[21] Appl. No.: 676,049

[22] Filed: Jul. 5, 1996

[30] Foreign Application Priority Data

Jul. 14, 1995 [DE] Germany ............... 195 25 608.5

[51] Int. Cl.$^6$ .............. C09B 33/10; C09B 35/029; D06P 1/06; D06P 3/60
[52] U.S. Cl. ............... 534/797; 534/719; 534/720; 534/801; 534/802; 534/803; 534/817; 534/829; 534/830; 534/841; 162/162; 106/22 K
[58] Field of Search ............... 534/797, 801, 534/802, 803, 817, 719, 720, 829, 830

[56] References Cited

U.S. PATENT DOCUMENTS

| | | | |
|---|---|---|---|
| 3,627,750 | 12/1971 | Ronco | 534/820 |
| 4,049,704 | 9/1977 | Jäger | 534/638 |
| 4,051,123 | 9/1977 | Piller et al. | 534/820 |
| 4,126,609 | 11/1978 | Jäger | 534/638 |
| 4,568,623 | 2/1986 | Makino et al. | 534/797 X |
| 4,990,615 | 2/1991 | Henk et al. | 544/76 |
| 4,994,110 | 2/1991 | Stoffel et al. | 106/22 D |
| 5,122,605 | 6/1992 | Pedrazzi | 544/76 |
| 5,262,527 | 11/1993 | Gregory et al. | 534/797 |
| 5,410,041 | 4/1995 | Müller | 540/126 |
| 5,534,052 | 7/1996 | Mennicke et al. | 106/22 D |
| 5,545,725 | 8/1996 | Käser et al. | 534/759 |

FOREIGN PATENT DOCUMENTS

| | | |
|---|---|---|
| 0259088 | 3/1988 | European Pat. Off. . |
| 0468648 | 1/1992 | European Pat. Off. . |
| 0584045 | 2/1994 | European Pat. Off. . |
| 0591103 | 4/1994 | European Pat. Off. . |
| 0657509 | 6/1995 | European Pat. Off. . |
| 2232541 | 1/1974 | Germany . |
| 61-238856 | 10/1986 | Japan . |

*Primary Examiner*—Floyd D. Higel
*Attorney, Agent, or Firm*—Sprung Kramer Schaeffer & Briscoe

[57] ABSTRACT

Dyestuffs of the formula (I)

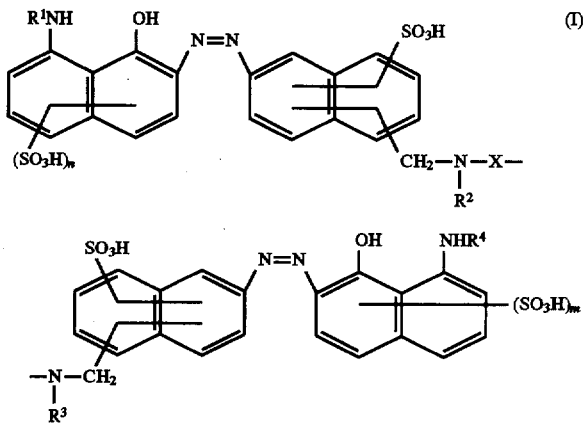

wherein $R^1$ and $R^4$ independently of one another represent an acyl radical, $R^2$ and $R^3$ independently of one another represent hydrogen or unsubstituted or substituted $C_1$–$C_4$-alkyl, X represents a bridge member which is not fibre-reactive and n and m independently of one another represent 1 or 2, are outstandingly suitable for dyeing and printing substrates containing hydroxyl and/or amide groups, in particular for printing paper by the ink-jet method.

11 Claims, No Drawings

DIRECT DISAZO DYESTUFFS

The invention relates to direct disazo dyestuffs, a process for their preparation and their use for dyeing and printing substrates containing hydroxyl and/or amide groups.

Disazo dyestuffs, which consist of two azo dyestuffs bridged by a bivalent reactive triazinyl radical, are also known, for example, from JP-A 8 580 932. Similar dyestuffs which contain a reactive triazinyl-containing bridge member are also already described in EP-A 584 045.

Compounds of the formula (I)

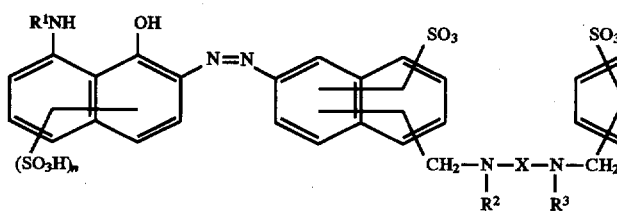

wherein

X represents a bridge member which is not fibre-reactive, $R^1$ and $R^4$ independently of one another represent an acyl radical, $R^2$ and $R^3$ independently of one another represent hydrogen or unsubstituted or substituted $C_1$–$C_4$-alkyl and n and m independently of one another represent 1 or 2, have now been found.

A bridge member which is not fibre-reactive is understood as meaning a bivalent radical which carries no fibre-reactive radicals which are capable of reacting with the OH or NH groups of fibres under dyeing conditions to form covalent bonds.

An acyl radical in the definition of $R^1$ and $R^4$ is in general understood as meaning an organic acid radical, in particular that of a carboxylic acid or a sulphonic acid.

Preferred possible acyl radicals in the definition of $R^1$ and $R^4$ are, independently of one another, alkenylcarbonyl, alkylcarbonyl, alkylsulphonyl, arylcarbonyl or arylsulphonyl. Preferred alkyl radicals here are those with $C_1$–$C_4$-alkyl, in particular methyl, ethyl, n-propyl, iso-propyl, n-butyl, sec-butyl or tert-butyl. Preferred aryl groups here are phenyl or naphthyl which are unsubstituted or substituted by substituents such as, preferably, Cl, COOH, $NO_2$, $C_1$–$C_4$-alkyl or $C_1$–$C_4$-alkoxy. Preferred alkenyl radicals are $C_2$–$C_4$-alkenyl, in particular $C_2$-alkenyl, which is optionally substituted by COOH or $C_1$–$C_4$-alkyl.

Possible acyl radicals containing COOH groups which may be mentioned here are, for example, those which are derived from maleic anhydride, succinic anhydride, glutaric anhydride, acetic anhydride, phthalic anhydride, citraconic anhydride or methylsuccinic anhydride.

However, an acyl radical is also understood as meaning a radical of the formula

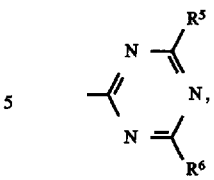

wherein $R^5$ and $R^6$ independently of one another represent OH, $C_1$–$C_4$-alkoxy, $C_6$–$C_{10}$-aryloxy, $C_6$–$C_{10}$-aryl, $C_1$–$C_4$-alkyl, $C_1$–$C_4$-alkylmercapto or phenylmercapto, $NH_2$ or mono- or disubstituted amino, such as mono- or di-$C_1$–$C_4$-alkylamino, 5- or 6-membered cyclic amino or mono- or di-$C_6$–$C_{10}$-arylamino.

In a preferred embodiment X represents CO or a radical of an aliphatic, aromatic, carbocyclic, heterocyclic or aromatic-heterocyclic dicarbonyl compound, or represents a radical of the formula

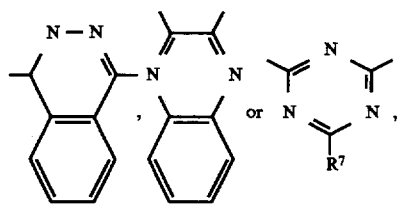

wherein $R^7$ represents OH, $C_1$–$C_4$-alkoxy, $C_6$–$C_{10}$-aryloxy, $C_6$–$C_{10}$-aryl, $C_1$–$C_4$-alkyl, $C_1$–$C_4$-alkylmercapto or phenylmercapto, $NH_2$ or mono- or disubstituted amino, such as mono- or di-$C_1$–$C_4$-alkylamino or —$C_6$–$C_{10}$-arylamino or 5- or 6-membered amino.

In a particularly preferred embodiment, $R^7$ represents $NR^{11}R^{12}$ wherein $R^{11}$ denotes hydrogen, $C_1$–$C_4$-alkyl or $C_2$–$C_4$-hydroxyalkyl and $R^{12}$ denotes $C_2$–$C_4$-hydroxyalkyl or $C_2$–$C_4$-hydroxyalkoxy-$C_2$–$C_4$-alkyl, or —$NR^{11}R^{12}$ forms a 5- or 6-membered ring which includes 1 to 3 heteroatoms and is unsubstituted or substituted by 1 to 3 substituents from the series consisting of $C_1$–$C_4$-alkyl and $C_2$–$C_4$-alkyl which is monosubstituted by hydroxyl or amino, and salts thereof.

Each alkyl or substituted alkyl radical defined for $R^{11}$ or $R^{12}$ can be straight-lined or branched.

In a hydroxyl- or hydroxyalkoxy-substituted alkyl group which is bonded to an N atom, the hydroxyl or hydroxyalkoxy group is preferably not on a C atom adjacent to the N atom. Likewise, the hydroxyl group in a hydroxyalkoxy group is preferably not on a C atom adjacent to the O atom.

If —NR¹¹R¹² denotes a heterocyclic ring, this can contain, in addition to the nitrogen atom, 1 or 2 other heteroatoms from the series consisting of N, O and S. Preferably, R¹¹ represents hydrogen, $C_1$–$C_2$-alkyl or $C_2$–$C_3$-hydroxyalkyl and R¹² represents $C_2$–$C_3$-hydroxyalkyl or $C_2$–$C_3$-hydroxyalkoxy-$C_2$–$C_3$-alkyl, or —NR¹¹R¹² represents a pyrrolidine, piperidine, morpholine or piperazine ring, which can be substituted by one to three groups from the series consisting of methyl and/or $C_2$–$C_3$-alkyl which is monosubstituted by hydroxyl or amino.

Particularly preferably, R¹¹ represents hydrogen, methyl or $C_2$–$C_3$-hydroxyalkyl and R¹² represents $C_2$–$C_3$-hydroxyalkyl, or —NR¹¹R¹² represents a piperidine, morpholine, piperazine or

N-piperazine ring, wherein

R¹³ denotes methyl, ethyl, 2-hydroxyethyl or 2-aminoethyl.

Particularly preferably, R¹¹ represents hydrogen or 2-hydroxyethyl and R¹² represents 2-hydroxyethyl.

X preferably represents

or a radical of a dicarbonyl compound of the formula

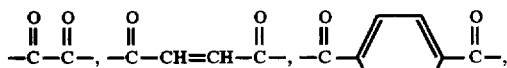

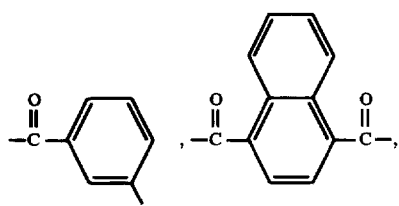

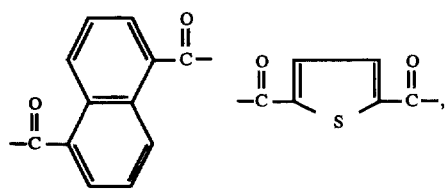

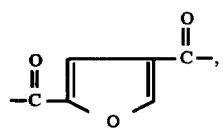

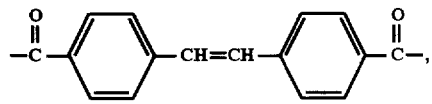

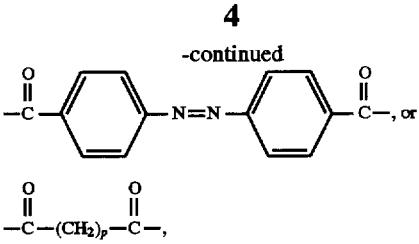

wherein o and p independently of one another represent a number from 1 to 6, or represents a bivalent radical of the formula

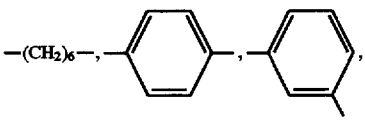

wherein Z denotes

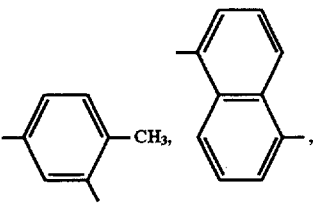

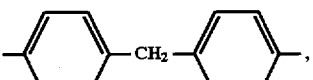

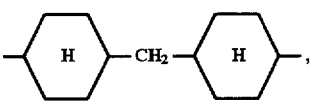

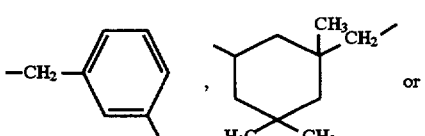

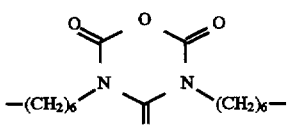

Especially preferably,

R¹ and R⁴ independently of one another represent $C_1$–$C_4$-alkylcarbonyl, such as methylcarbonyl, ethylcarbonyl or propyl or butylcarbonyl, benzoyl which is unsubstituted or substituted by $C_1$–$C_4$-alkyl, $C_1$–$C_4$-alkoxy and/or $NO_2$, or maleinyl, or represents a radical of the formula

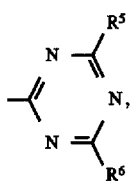

wherein
$R^5$ and $R^6$ independently of one another denote OH, $C_1$–$C_4$-alkoxy, $C_1$–$C_4$-alkylthio, phenylthio, phenoxy, $NH_2$ or $NR^8R^9$,
wherein
$R^8$ denotes hydrogen, $C_1$–$C_4$-alkyl or $C_1$–$C_4$-hydroxyalkyl and
$R^9$ $C_1$–$C_4$-alkyl, $C_2$–$C_4$-hydroxyalkyl or $C_2$–$C_4$-hydroxyalkoxy-$C_2$–$C_4$-alkyl, or —$NR^8R^9$ forms a 5- or 6-membered ring which includes 1 to 3 heteroatoms and is unsubstituted or substituted by 1 to 3 substituents from the series consisting of $C_1$–$C_4$-alkyl and $C_1$–$C_4$-alkyl which is monosubstituted by hydroxyl or amino.

Each alkyl or substituted alkyl radical defined for $R^8$ or $R^9$ can be straight-lined or branched.

In a hydroxyl or hydroxyalkoxy-substituted alkyl group bonded to an N atom, the hydroxyl or hydroxyalkoxy group is preferably not on a C atom adjacent to the N atom. Likewise, the hydroxyl group in a hydroxyalkoxy group is preferably not on a C atom adjacent to the O atom.

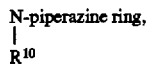

N-piperazine ring, wherein
$R^{10}$ denotes methyl, ethyl, 2-hydroxyethyl or 2-aminoethyl.

Particularly preferably, $R^8$ represents hydrogen or 2-hydroxyethyl and $R^9$ represents 2-hydroxyethyl.

Preferred substituents of the alkyl groups in the definition of $R^2$ and $R^3$ are OH, $OCH_3$ or $OC_2H_5$.

Preferred compounds of the formula (I) correspond to the formula (II)

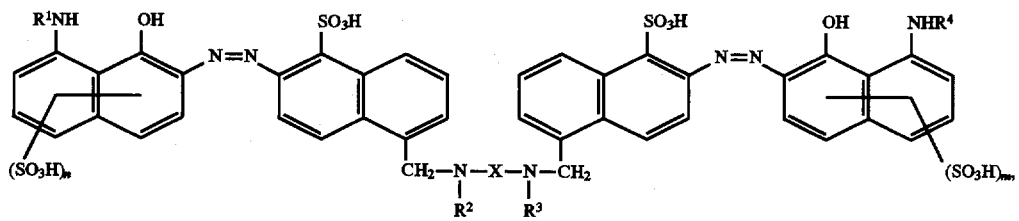

If —$NR^8R^9$ denotes a heterocyclic ring, this can contain, in addition to the nitrogen atom, 1 or 2 further heteroatoms from the series consisting of N, O and S. Preferably, $R^8$ represents hydrogen, $C_1$–$C_2$-alkyl or $C_2$–$C_3$-hydroxyalkyl and $R_9$ represents $C_2$–$C_3$-hydroxyalkyl or $C_2$–$C_3$-hydroxyalkoxy-$C_2$–$C_3$-alkyl, or —$NR^8R^9$ represents a pyrrolidine, piperidine, morpholine or piperazine ring, which can be substituted by one to three groups from the series consisting of methyl and/or $C_2$–$C_3$-alkyl which is monosubstituted by hydroxyl or amino.

Particularly preferably, $R^8$ represents hydrogen, methyl or $C_2$–$C_3$-hydroxyalkyl and $R^9$ represents $C_2$–$C_3$-hydroxyalkyl, or —$NR^8R^9$ represents a piperidine, morpholine, piperazine or wherein
$R^1$ to $R^4$, X and n and m have the abovementioned meaning.

Further preferred compounds of the formula (I) correspond to the formula (III)

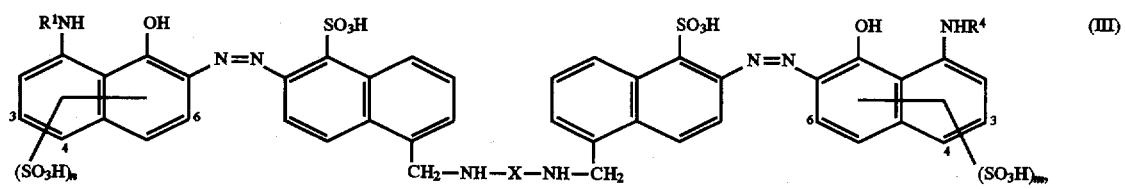

wherein the $SO_3H$ groups in the terminal naphthalene rings in each case independently of one another are in positions 3, 4 and/or 6, $R^1$ and $R^4$ independently of one another represent $C_1$–$C_4$-alkylcarbonyl, benzoyl or benzoyl which is substituted by $C_1$–$C_4$-alkyl, $C_1$–$C_4$-alkoxy and/or $NO_2$ and X, m and n have the abovementioned meaning.

Especially preferred compounds of the formula (I) correspond to the formula (IV)

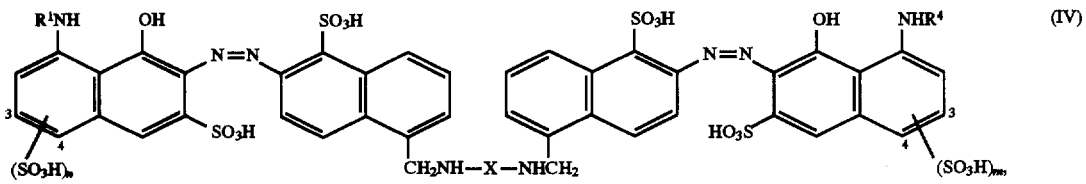

wherein the SO₃H group in the particular terminal naphthalene rings in each case independently of one another is in position 3 or 4 and X, R¹ and R⁴ have the abovementioned meaning.

The compounds of the formula (I) can be symmetric or asymmetric.

Symmetric compounds of the formula (I) wherein
$R^1=R^4$,
$R^2=R^3$,
n=m and the positions of the SO₃H groups on the right-hand half of the molecule are identical to those on the left-hand half of the molecule, and X has the abovementioned meaning,
are preferred.

Preferred asymmetric compounds of the formula (I) are those wherein
X represents a radical of the formula

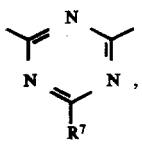

in which $R^7$ has the abovementioned meaning and $R^1 \neq R^4$ and/or $R^2 \neq R^3$ and/or n≠m and/or the positions of the SO₃H groups on the right-hand half of the molecule differ from those on the left-hand half of the molecule.

The compounds of the formula (I) can be in the form of the free acid, in the form of a salt of alkali metals, such as lithium, sodium or potassium, or in the form of an unsubstituted or substituted ammonium salt, mixed salts in particular also being possible. In salts containing substituted ammonium as the cation, this can be derived from a primary, secondary or tertiary amine, and the following amines, for example, are suitable: mono-, di- or trimethyl-, -ethyl-, -propyl- or-butylamine; mono-, di- or tri-ethanol-, -propanol- or -isopropanolamine; N-methyl-N-hydroxyethylamine, N-methyl-N,N-di(hydroxyethyl)amine, N-ethyl-N-hydroxyethylpiperazine; ethylenediamine, hexamethylenediamine; dimethylaminopropylamine, diethylaminopropylamine, diethyleneglycolamine, diglycolamine and 3-methoxypropylamine.

Polyglycolamines which can be obtained, for example, by reaction of ammonia or an alkyl- or hydroxyalkylamine with alkyleneoxides, are also suitable as amines.

A quaternary ammonium ion which is derived from ammonium compounds which preferably contain one or two quaternary ammonium ions can also be present as the substituted ammonium ion, examples which may be mentioned being: tetramethyl-, tetraethyl-, trimethylethyl-, dimethyl-di-(2-hydroxypropyl)-, trimethylhydroxyethyl-, tetrahydroxyethyl- and trimethylbenzyl-ammonium hydroxide.

The invention furthermore relates to a process for the preparation of compounds of the formula (I), which is characterized in that a monoazo dyestuff of formula (V) in the form of the compound (Va) and/or (Vb)

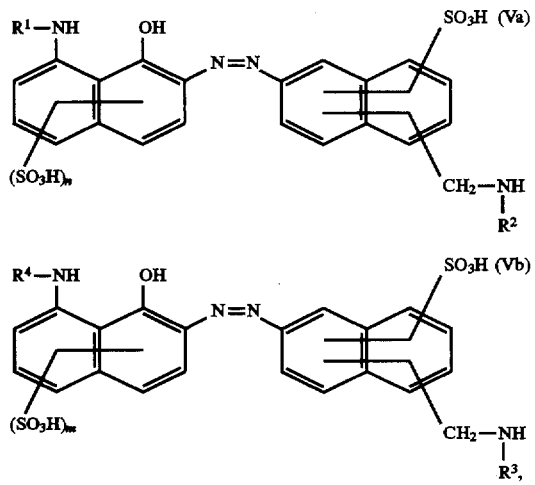

wherein $R^1$ to $R^4$, n and m have the abovementioned meanings, is reacted with reactive compounds which contain at least two groups which are reactive towards primary or secondary amines, the molar ratio of the monoazo dyestuff of the formula (V) to the reactive compound being ≧2:1. Lower ratios are of course also possible, but they do not lead to stoichiometric conversion. A ratio of (V) to the reactive compound of greater than 3:1 indeed likewise leads to the desired target product, but this process variant is to be described as uneconomical.

In the case where the reactive compound contains more than two groups which are reactive towards primary or secondary amines and which can also react as fibre-reactive radicals, these can be converted into groups which are not fibre-reactive in a subsequent reaction, for example by hydrolysis, alcoholysis or aminolysis.

In a preferred embodiment of the process according to the invention, the reactive compound used is phosgene, aliphatic, aromatic, carbocyclic, heterocyclic or aromatic-heterocyclic dicarboxylic acids or derivatives thereof, such as esters, halides, in particular chlorides, or isocyanates, or dihalogeno-heterocyclic compounds of the formula

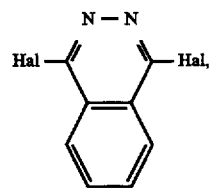

-continued

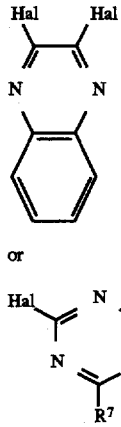

or wherein

R⁷ has the abovementioned meaning, or represents Hal, if Hal is converted into a radical R⁷ in a subsequent reaction with H-R⁷ at temperatures of 50° to 100° C. (cf. DE-A 4 005 551), and Hal independently of one another represents halogen, in particular Cl, Br or F.

The reaction conditions for the preparation of the compounds of the formula (I) can essentially be transferred from EP-A 361 186.

The compounds of the formula (I) are preferably employed as dyestuffs for dyeing and printing substrates containing hydroxyl and/or amide groups, and dye cellulose-containing materials in brilliant red shades, in particular paper, cotton and viscose as well as leather with good wet fastness fastness and light properties.

The dyestuffs can be used in all the processes customary for direct dyestuffs in the paper and textile industry, in particular in pulp and in surface dyeing of paper for sized or unsized grades, starting from bleached or non-bleached pulp of differing origin, such as softwood or hardwood sulphite and/or sulphate pulp. They can also be used in dyeing yarn and piece goods of cotton, viscose and linen by the exhaust process from a long liquor or in continuous processes.

The invention furthermore relates to a process for dyeing cellulose-containing materials with the dyestuffs of the formula (I).

The compounds of the formula (I) according to the invention can be employed in the form of solid or liquid dyestuff preparations. They are preferably employed in the form of aqueous preparations, in particular solutions. These aqueous dyestuff preparations in general comprise one or more dyestuffs of the formula (I), if appropriate suitable organic solvents, which can also include hydrotropic compounds, and further auxiliaries and/or stabilizers.

The aqueous dyestuff preparations can be prepared by dissolving the dyestuff salts in water, or from the condensation solutions, which are subjected to desalination, for example by pressure permeation, if appropriate, and/or by addition of one or more of the abovementioned organic solvents, if appropriate at elevated temperatures (30° to 100° C., in particular 30° to 50° C.) and with the addition of inorganic and organic bases; if appropriate, customary ionic or nonionic additives can additionally also be used, for example those with which the viscosity can be reduced and/or the surface tension increased.

The use form of the aqueous dyestuff preparations is particularly preferred for dyeing or printing paper. A stable, liquid, aqueous, concentrated dyestuff preparation can be prepared in a generally known manner by dissolving the dyestuffs in water, if appropriate with the addition of one or more auxiliaries, for example a hydrotropic compound or a stabilizer. The possibility of preparation of such stable, aqueous, concentrated preparations in the course of the dyestuff synthesis itself without intermediate isolation of the dyestuff is of particular advantage.

The aqueous dyestuff preparations in general comprise about 0.5 to 20% by weight of one or more dyestuffs of the formula (I) and 80 to 99.5% by weight of water and/or organic solvent, and if appropriate other customary constituents.

Preferred organic solvents here are alcohols and ethers or esters thereof, carboxylic acid amides, ureas, sulphoxides and sulphones, in particular those having molecular weights <200. Particularly suitable solvents are, for example: methanol, ethanol, propanol; ethylene glycol, propylene glycol, diethylene glycol, thiodiethylene glycol and dipropylene glycol; butanediol; β-hydroxypropiononitrile, pentamethylene glycol, ethylene glycol monoethyl and -propylether, ethylene diglycol monoethyl ether, triethylene glycol monobutyl ether, butylpolyglycol, formamide, triethylene glycol, 1,5-pentanediol, 1,3,6-hexanetriol, 2-hydroxyethyl acetate, 2-(2'-hydroxy)ethyl acetate, glycerol, glycol acetate, 1,2-dihydroxypropane, 1-methoxy-2-propanol, 2-methoxy-1-propanol, N,N-dimethylformamide, pyrrolidone, N-methyl-caprolactam, ε-caprolactam, N-methyl-caprolactam, butyrolactone, urea, tetramethylurea, 1,3-dimethyl-2-imidazolidinone, N,N'-dimethylolpropylene-urea, dimethyl sulphoxide, dimethyl sulphone, sulpholane, isopropanol and polyethylene glycol.

Possible further additives which are customary for aqueous dyestuff preparations, in particular for printing inks, are those ionic or nonionic substances with which the viscosity and/or surface tension can be adjusted within the ranges required for the use, such as, for example, anionic, cationic or neutral surfactants, such as dispersing agents, and viscosity regulators. The function of viscosity regulators can be taken over, for example, by the organic solvents.

Preferred preparations are aqueous dyestuff preparations, in particular dyestuff solutions, having the following composition:

0.5 to 20% by weight, in particular 1 to 15% by weight, of one or more dyestuffs of the type mentioned, 50 to 99.5% by weight, in particular 85 to 99% by weight, of water, 0 to 50% by weight, in particular 0 to 20% by weight, of one or more organic solvents and 0 to 30% by weight, in particular 0 to 5% by weight, of additives which influence the viscosity and/or surface tension, the sum of the constituents mentioned adding up to 100% by weight.

The aqueous dyestuff preparations can be prepared by dissolving the dyestuff salts in water, or from the condensation solutions, which are subjected, if appropriate, to isomer exchange and/or desalination, for example by pressure permeation, and/or by addition of one or more of the abovementioned organic solvents, if appropriate at elevated temperatures (30° to 100° C., in particular 30° to 50° C.) and with the addition of inorganic and organic bases; if appropriate, customary ionic or nonionic additives can also additionally be used, for example those with which the viscosity can be reduced and/or the surface tension increased.

Instead of the salts of (I), it is also possible to employ the corresponding free acids in combination with at least equimolar amounts of the corresponding organic or inorganic bases.

Inorganic bases which can be employed are, for example, lithium hydroxide, sodium hydroxide, potassium hydroxide, lithium carbonate, sodium carbonate or potassium carbonate.

Organic bases which can be used are, for example, ethanolamine, diethanolamine, triethanolamine, N-methylethanolamine, N,N-dimethylethanolamine, N-methyldiethanolamine, 1-amino-2-propanol, 2-amino-1-propanol, di-isopropanolamine, N-2-hydroxyethyldiisopropanolamine, Tris, N,N,N-[2-(2'-hydroxyethoxy)-ethyl]amine or sodium methylate, lithium ethylate or potassium tert-butylate.

The aqueous dyestuff preparations according to the invention are also suitable, for example, as printing inks, which can also be employed, in particular, as recording liquids by the ink-jet method.

The invention therefore also relates to the use of the aqueous dyestuff preparations according to the invention as a recording liquid for ink-jet recording systems for production of brilliant red to magenta prints.

The ink-jet method of the process according to the invention is understood as meaning an ink-jet recording process in which the drops of ink are sprayed onto the substrate. The fine droplets of ink can be produced by various processes. They are preferably produced by the generally known thermal-jet (for example bubble-jet), piezo-jet or valve-jet processes. The preferred recording material for the ink-jet printer is paper.

The following advantages remit when the aqueous dyestuff preparations according to the invention are used as a recording liquid for ink-jet recording systems: the physical properties, such as viscosity, surface tension and the like, lie in the suitable ranges; the recording liquid causes no blockages in the fine release openings of ink-jet recording devices; it produces images of high density; during storage, no change in physical properties or deposition of solid constituents occurs in the recording liquid; the recording liquid is suitable for recording on various recording media without limitations in respect of the nature of the recording media; finally, the recording liquid is fixed rapidly and produces images of excellent water resistance, fastness to light, abrasion resistance and resolution.

The following preparation examples are intended to illustrate the present invention, but without limiting it thereto. In the examples, parts always denotes parts by weight, unless stated otherwise.

EXAMPLES

The following monoazo dyestuffs were employed as starting compounds for the preparation of the dyestuffs (I) according to the invention. Their preparation is described in DOS 2 232 541, or was carried out in a corresponding manner.

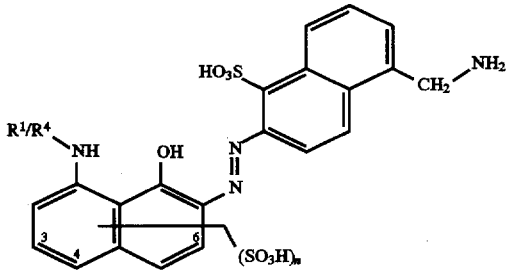

| Monoazo dyestuff | $R^1/R^4$ | n | Position of the $SO_3H$ group(s) |
|---|---|---|---|
| 1 | −C(=O)−C$_6$H$_5$ | 2 | 4,6 |
| 2 | −C(=O)−C$_6$H$_5$ | 2 | 3,6 |
| 3 | −C(=O)−C$_6$H$_5$ | 1 | 6 |
| 4 | C(=O)−CH=CH−COOH | 2 | 4,6 |
| 5 | C(=O)−CH=CH−COOH | 2 | 3,6 |

-continued

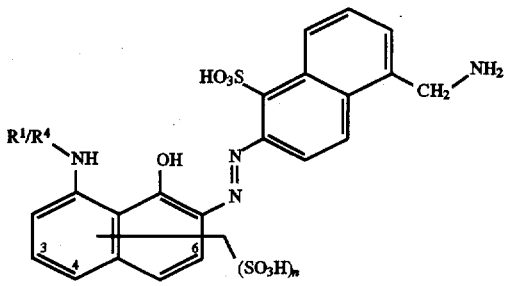

| | | n | |
|---|---|---|---|
| 6 | C—CH=CH—COOH<br>‖<br>O | 1 | 6 |
| 7 | C—CH₃<br>‖<br>O | 2 | 4,6 |
| 8 | C—CH₃<br>‖<br>O | 2 | 3,6 |
| 9 | C—CH₃<br>‖<br>O | 1 | 6 |

| Monoazo dyestuff | $R^1/R^4$ | $R^5, R^6$ | n | Position of the $SO_3H$ group(s) |
|---|---|---|---|---|
| 10 | triazine with $R^5, R^6$ | $-NHC_2H_4OH$ | 2 | 3,6 |
| 11 | triazine with $R^5, R^6$ | $-NHC_2H_4OH$ | 2 | 4,6 |
| 12 | triazine with $R^5, R^6$ | morpholino | 2 | 3,6 |
| 13 | triazine with $R^5, R^6$ | morpholino | 2 | 4,6 |
| 14 | triazine with $R^5, R^6$ | $NH(CH_2)_3-N(CH_3)_2$ | 2 | 3,6 |
| 15 | triazine with $R^5, R^6$ | $NH(CH_2)_3-N(CH_3)_2$ | 2 | 4,6 |

Example 1

150 parts of the monoazo dyestuff 1 as the Na₃ salt were dissolved in 2.5 l of water at pH 9.5, with the addition of LiOH. While keeping the pH at pH 8, phosgene was passed in at a temperature of not more than 45° C. until the acylation had ended. The reaction product partly precipitated. Precipitation was brought to completion by addition of 600 parts of sodium chloride. The precipitate was filtered off with suction and dried at 70° C. 225 g of a salt-containing dyestuff of the formula

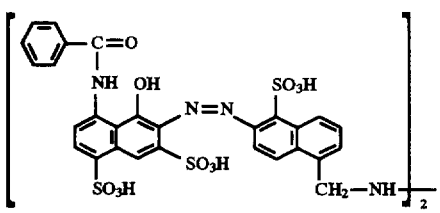

were obtained as the Na₆ salt.

$\lambda_{max}$ (pH 9, water): 511, 540 nm

The dyestuff dyes paper in the pulp by the customary methods in brilliant bluish-tinged red shades.

Example 2

When dyestuff 2, dissolved in 2 l of water, was used as the starting substance and the procedure was analogous to Example 1, 210 g of a salt-containing dyestuff which, in the form of its free acid, corresponds to the formula:

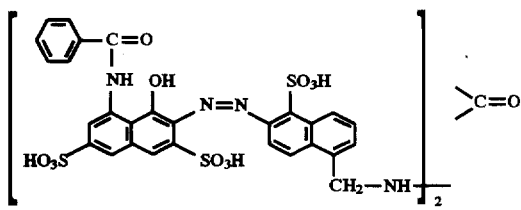

were obtained.

$\lambda_{max}$ (pH 9, water): 519, 546 nm

It dyes paper in brilliant bluish-tinged red shades.

Example 3

150 parts (0.2 mol) of the monoazo dyestuff 2 were dissolved in 2.2 l of water at pH 10.5, with NaOH, and 60° C. 22 g of terephthalic acid dichloride were sprinkled in in the course of 1 h, and the pH was allowed to fall to 9 and kept at this value with 5% strength by weight NaOH. The mixture was stirred for a further 1.5 hours at 60° C. at a pH of 9. The product was then precipitated with 250 g of sodium chloride, isolated and dried at 60° C. in vacuo. 205 g of a salt-containing dyestuff which, in the form of its free acid, corresponds to the formula:

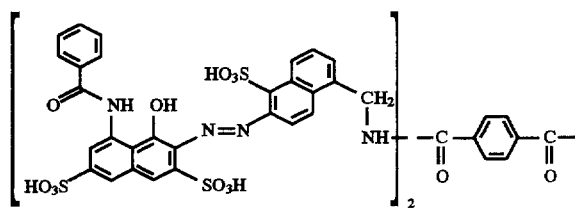

were obtained.

$\lambda_{max}$ (pH 9, water): 519, 544 nm

The dyestuff dyed paper in brilliant magenta shades.

Example 4

When the monoazo dyestuff 1 was used as the starting substance and the procedure was analogous to Example 3, 200 g of a dyestuff, as the Na₆ salt, which, in the form of the free acid, corresponds to the following formula:

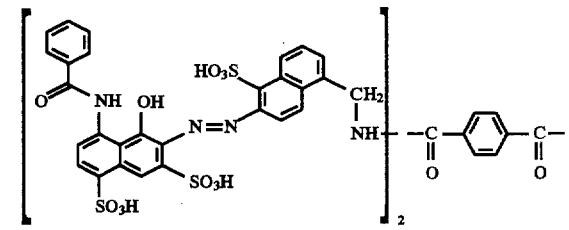

were obtained.

$\lambda_{max}$ (pH 9, water): 512, 540 nm (shoulder)

It dyes paper in brilliant red shades.

Example 5

When the procedure was analogous to Example 3 and 130 g (0.2 mol) of the monoazo dyestuff 3 as the Na₆ salt were used, 180 g of dyestuff of the formula of Example 3 without an SO₃H group in position 3 were obtained.

It dyed paper in red shades.

$\lambda_{max}$ (pH 9, water): 516 nm

Example 6

A. 150 parts (0.2 mol) of monoazo dyestuff 2, as the Na₃ salt, were stirred in 1.5 l of water at 20° C. and pH 8. 88 g (0.11 mol) of trichlorotriazine were sprinkled into the suspension in the course of 0.5 hour and the pH was kept at 8 with sodium carbonate solution. Thereafter, the mixture was heated to 50° C. and stirred at this temperature for 1 hour, the pH 8 being maintained with sodium carbonate solution. A red solution of the dyestuff which, in the form of its free acid, corresponds to the formula

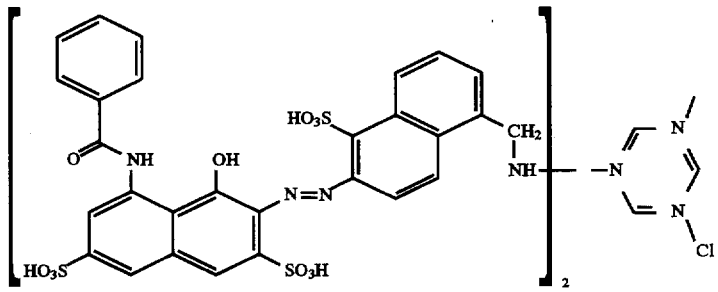

was obtained.

B. 70 ml of diethanolamine were added to the above solution and the mixture was heated at 95° C. for about 1 hour. The solution was allowed to cool to 85° to 90° C. and 350 g of sodium chloride were then sprinkled in. The dyestuff of the formula

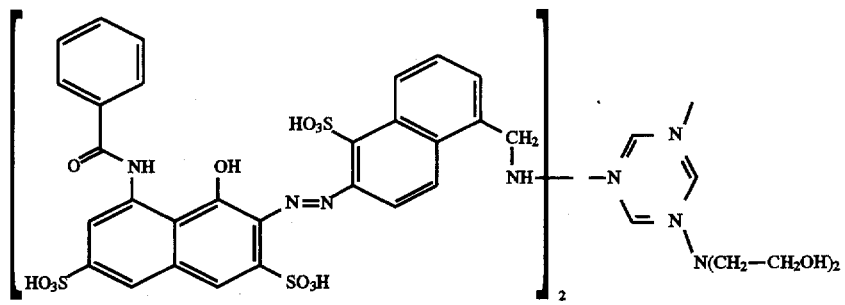

as the Na salt, which had precipitated was isolated at 50° C.
$\lambda_{max}$ (pH 9, water): 519, 545 nm
It dyed paper in brilliant, light-fast magenta shades.

Examples 7 to 45

Further valuable direct disazo dyestuffs of the formula (I) wherein X denotes a radical of the formula

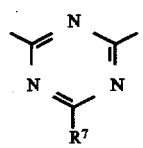

were prepared by a method analogous to that described in Example 6 using corresponding monoazo dyestuffs. All the dyestuffs dye paper and cotton in brilliant red to magenta shades.

TABLE

| Example No. | Monoazo dyestuff | $R^7$ | Colour shade[1)] | $\lambda_{max}$ water pH 9 [nm] |
|---|---|---|---|---|
| 7 | 2 | —NHC$_2$H$_4$OH | m | 517 |
| 8 | 2 | —N—C$_2$H$_4$OH \| CH$_3$ | m | 518 |
| 9 | 2 | —N  O (morpholino) | m | 518 |
| 10 | 2 | —N  N—C$_2$H$_5$ | m | 519 |
| 11 | 2 | —N  N—C$_2$H$_4$OH | m | 519 |
| 12 | 2 | NH(CH$_2$)$_{10}$COOH | m | 517 |
| 13 | 1 | NHC$_2$H$_4$OH | br | 511 |
| 14 | 1 | —N—C$_2$H$_4$OH \| CH$_3$ | br | 511 |

TABLE-continued

| Example No. | Monoazo dyestuff | R⁷ | Colour shade[1] | $\lambda_{max}$ water pH 9 [nm] |
|---|---|---|---|---|
| 15 | 1 | —N(CH₂CH₂)₂O (morpholino) | br | 512 |
| 16 | 1 | —N(CH₂CH₂)₂N—C₂H₅ | br | 512 |
| 17 | 1 | —N(CH₂CH₂)₂N—CH₃ | br | 512 |
| 18 | 1 | —N(CH₂CH₂)₂N—C₂H₄OH | br | 512 |
| 19 | 1 | —N(C₂H₄OH)₂ | br | 511 |
| 20 | 3 | —NHC₂H₄OH | br | 516 |
| 21 | 3 | —N(CH₂CH₂)₂O | br | 517 |
| 22 | 3 | —N(CH₂CH₂)₂N—CH₂—CH₂OH | br | 516 |
| 23 | 3 | —N(C₂H₄OH)₂ | br | 516 |
| 24 | 5 | —N(C₂H₄OH)₂ | m | 517 |
| 25 | 5 | —NHC₂H₄OH | m | 517 |
| 26 | 5 | —N(CH₂CH₂)₂O | m | 518 |
| 27 | 4 | —N(CH₂CH₂)₂N—C₂H₄OH | br | 510 |
| 28 | 4 | —N(CH₂CH₂)₂O | br | 509 |
| 29 | 4 | —N(C₂H₄OH)₂ | br | 509 |
| 30 | 6 | —N(CH₂CH₂)₂O | br | 516 |
| 31 | 7 | —N(C₂H₄OH)₂ | r | 507 |
| 32 | 7 | —NHC₂H₄OH₂ | r | 507 |
| 33 | 7 | —N(CH₂CH₂)₂O | r | 508 |
| 34 | 7 | —N(CH₂CH₂)₂N—CH₂—CH₂OH | r | 508 |

TABLE-continued

| Example No. | Monoazo dyestuff | R⁷ | Colour shade[1] | $\lambda_{max}$ water pH 9 [nm] |
|---|---|---|---|---|
| 35 | 8 | —NHC₂H₄OH | br | 511 |
| 36 | 8 | —N(C₂H₄OH)₂ | br | 511 |
| 37 | 8 | —N(morpholino) | br | 513 |
| 38 | 8 | —N(N-methylpiperazino)—N—CH₃ | br | 513 |
| 39 | 9 | —N(morpholino) | br | 512 |
| 40 | 10 | —N(C₂H₄OH)₂ | m | 519 |
| 41 | 12 | —N(C₂H₄OH)₂ | m | 519 |
| 42 | 14 | —N(C₂H₄OH)₂ | m | 519 |
| 43 | 11 | —N(morpholino) | br | 512 |
| 44 | 13 | —N(morpholino) | br | 511 |
| 45 | 15 | —N(morpholino) | br | 513 |

[1] r = red; br = bluish red; m = magenta

Example 46

150 parts (0.2 mol) of monoazo dyestuff 2 were dissolved in 2.3 l of water at pH 9, with LiOH, and 60° C. 27.7 parts (0.11 mol) of 1,5-diisocyanato-naphthalene were added in 10 portions in the course of 30 minutes and the temperature was kept at 60° C. and the pH at 8 to 8.5 with LiOH. The mixture was subsequently stirred under these conditions for 2 hours and at 80° C. for a further 30 minutes. After clarification, about 200 g were precipitated with 8% of the volume of sodium chloride and dried at 60° C. in vacuo.

220 g of the dyestuff, as the Na₆ salt, which, in the form of the free acid, corresponds to the formula:

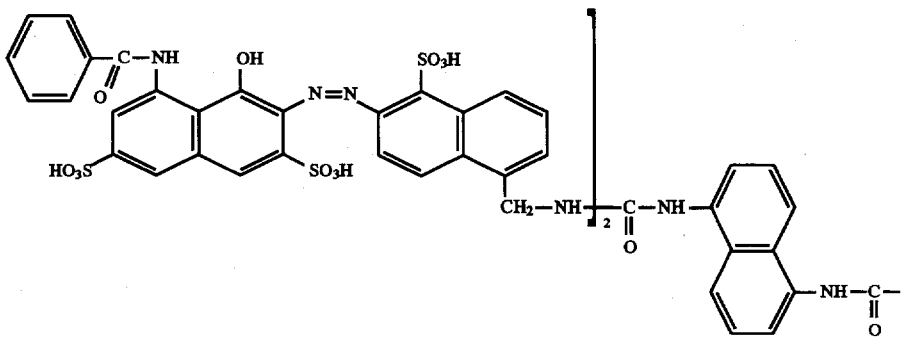

were obtained.

$\lambda_{max}$ (pH 9, water): 520, 547 nm

It dyes paper in brilliant magenta shades.

Further disazo dyestuffs of the formula (I) wherein X denotes a radical of the formula (VI)

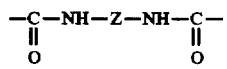 (VI)

were prepared by a method analogous to that described in Example 46, the following diisocyanates of the formula (VII)

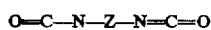 (VII)

being employed. In these formulae, Z represents:

A: —(CH$_2$)$_6$—

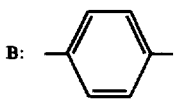

B:

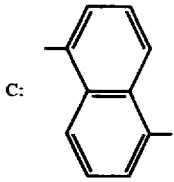

C:

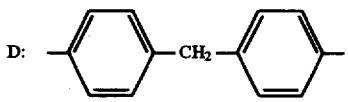

D:

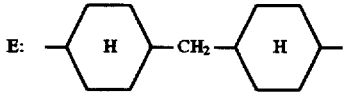

E:

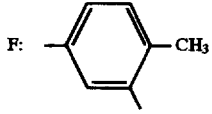

F:

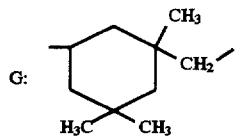

G:

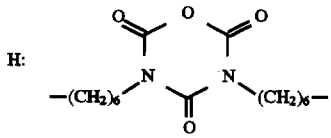

H:

| Example No. | Monoazo dyestuff | Z | Colour shade[1] | $\lambda_{max}$ in water pH 9 [nm] |
|---|---|---|---|---|
| 47 | 1 | C | br | 512 |
| 48 | 1 | A | br | 511 |
| 49 | 1 | B | br | 514 |
| 50 | 1 | D | br | 510 |
| 51 | 1 | E | br | 511 |
| 52 | 1 | F | br | 515 |
| 53 | 1 | G | br | 513 |
| 54 | 1 | H | br | 510 |
| 55 | 2 | A | m | 517 |
| 56 | 2 | B | m | 519 |
| 57 | 2 | D | m | 516 |
| 58 | 2 | E | m | 517 |
| 59 | 2 | F | m | 524 |
| 60 | 2 | G | m | 521 |
| 61 | 2 | H | m | 515 |
| 62 | 3 | C | br | 517 |
| 63 | 3 | D | br | 519 |
| 64 | 3 | A | br | 517 |
| 65 | 7 | A | r | 506 |
| 66 | 7 | B | r | 507 |
| 67 | 7 | C | r | 508 |
| 68 | 7 | D | r | 505 |
| 69 | 7 | E | r | 506 |
| 70 | 7 | F | r | 508 |
| 71 | 7 | G | r | 508 |
| 72 | 7 | H | r | 506 |
| 73 | 8 | A | br | 512 |
| 74 | 8 | B | br | 515 |
| 75 | 8 | C | br | 515 |
| 76 | 8 | D | br | 511 |
| 77 | 8 | E | br | 512 |
| 78 | 8 | F | br | 516 |
| 79 | 4 | A | br | 507 |
| 80 | 4 | B | br | 508 |
| 81 | 4 | C | br | 509 |
| 82 | 4 | D | br | 506 |
| 83 | 4 | G | br | 509 |
| 84 | 5 | A | m | 516 |
| 85 | 5 | B | m | 518 |
| 86 | 5 | C | m | 519 |
| 87 | 5 | D | m | 515 |
| 88 | 5 | E | m | 516 |
| 89 | 5 | H | m | 514 |

[1] r = red; br = bluish red; m = magenta.

Example 90

200 g of the salt-containing dyestuff of Example 3 were dissolved in 3 l of water at 40° C. and a pH of 8. The solution was concentrated to 1.5 l in a customary pressure permeation unit (with, for example, membrane G 20 from Sesal), and ultrafiltration was carried out until the Cl$^\ominus$ content was <0.05%. The solution was then concentrated to about 1 l, so that the dyestuff content was 10.5%, based on the Na$_6$ salt.

This solution is stable for a relatively long time and was employed directly for dyeing paper or cotton and for the preparation of printing inks for ink-jet printing.

Stable, concentrated solutions were also obtained in a corresponding manner from the other dyestuffs described in the examples.

Use instructions A 0.5 part of the dyestuff powder from Example 3 are dissolved in 100 parts of hot water and the solution is cooled to room temperature. The solution is added to 100 parts of chemically bleached sulphite cellulose, which has been beaten in a beater with 2,000 parts of water. After thorough mixing for 15 minutes, sizing is carried out in the customary manner with rosin size and aluminium sulphate. Paper produced from this material shows a bluish red colour shade and has good fastness to wastewater, good wet fastness and good fastness to light.

Use instructions B 50 parts of bleached softwood sulphite pulp and 50 parts of bleached beech pulp (degree of freeness 30° SR (°SR= degrees Schopper Riegler) and 0.5 part of the dyestuff from Example 3 are mixed in water (pH 4, water hardness 10° dH [German Hardness]. Sheet formation is carried out after 16 minutes. The paper is dyed an intensively bluish red shade.

In contrast, dyeing at pH 7 shows no deviation in strength or shade. The degree of exhaustion reaches 100% and the wastewater is colourless.

Use instructions C 100 g of dyestuff solution from Example 46 were stirred with 25 g of 2-pyrrolidone and 225 g of water and the mixture was clarified over a 0.8μ filter. The ink cartridges of a commercially available ink-jet printer, for example HP Desk Jet 560, Canon BJC 600 and BJC 4000, were filled with this ink and brilliant magenta prints which were fast to light and bleeding were produced on paper with the corresponding printers.

Instead of pyrrolidone, the otherwise customary organic solvents, such as di- or triethylene glycol, pentanediol, 1,2-propylene glycol, urea and the like, were also used.

When the dyestuff of the formula of Example 4 was used, brilliant magenta prints which were fast to light and water and have an absorption maximum lower by 7 nm were likewise obtained.

We claim:

1. Compound of the formula (I)

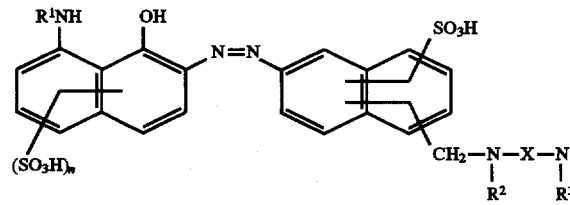

wherein $R^1$ and $R^4$ independently of one another represent an acyl radical, $R^2$ and $R^3$ independently of one another represent hydrogen or unsubstituted or substituted $C_1$–$C_4$-alkyl, X represents a bridge member which is not fibre-reactive and n and m independently of one another represent 1 or 2.

2. Compound according to claim 1, wherein $R^1$ and $R^4$ independently of one another denote alkylcarbonyl, alkylsulphonyl, arylcarbonyl, arylsulphonyl or a radical of the formula

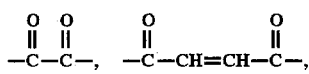

wherein $R^5$ and $R^6$ independently of one another represent OH, $C_1$–$C_4$-alkoxy, $C_6$–$C_{10}$-aryloxy, $C_6$–$C_{10}$-aryl, $C_1$–$C_4$-alkyl, $C_1$–$C_4$-alkylmercapto or phenylmercapto, $NH_2$ or mono- or disubstituted amino.

3. Compound according to claim 1, wherein

X represents CO or a radical of an aliphatic, aromatic, carbocyclic, heterocyclic or aromatic-heterocyclic dicarbonyl compound, or represents a radical of the formula

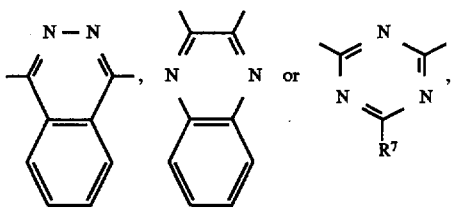

wherein $R^7$ represents OH, $C_1$–$C_4$-alkoxy, $C_6$–$C_{10}$-aryloxy, $C_6$–$C_{10}$-aryl, $C_1$–$C_4$-alkyl, alkyl or aryl (mercapto), $NH_2$ or mono- or disubstituted amino.

4. Compound according to claim 1, wherein

X represents CO or a dicarbonylidene radical of the formula

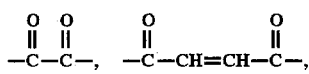

-continued

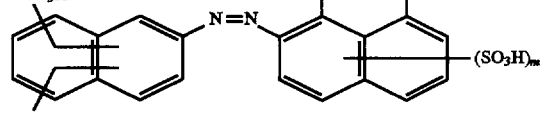

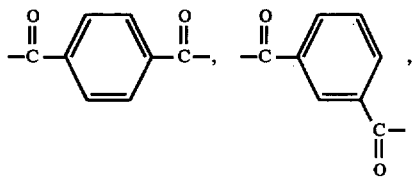

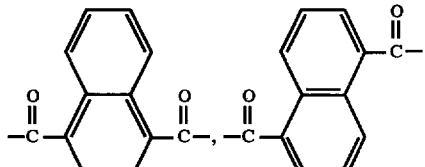

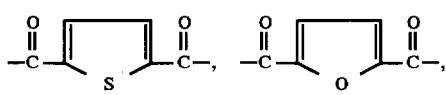

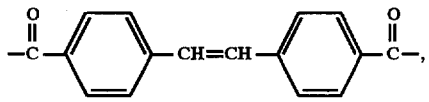

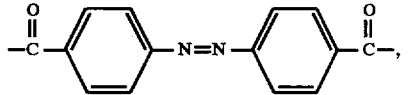

or

27

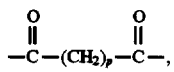

wherein represents a number from 1 to 6, or represents a bivalent radical of the formula

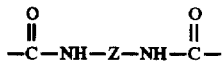

wherein Z denotes

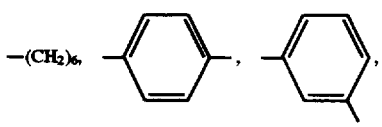

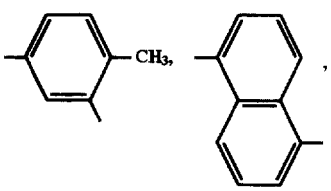

28

-continued

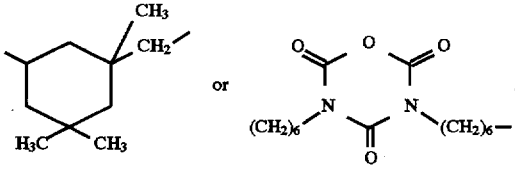

5. Compound according to claim 1, which corresponds to the formula (II)

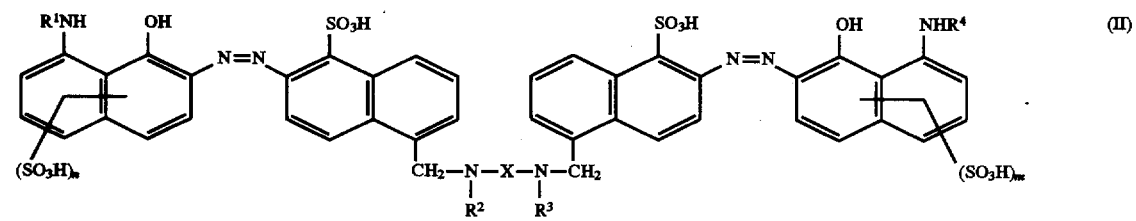

(II)

6. Compounds according to claim 1, which corresponds to the formula (III)

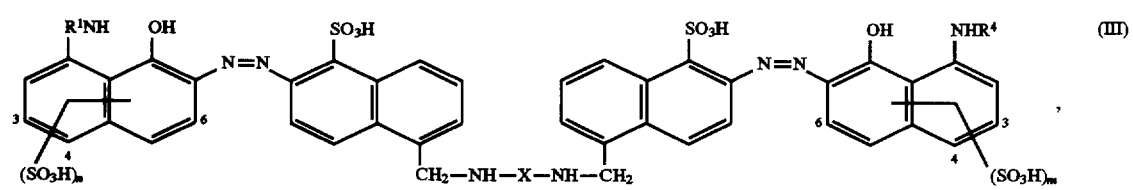

(III)

wherein the $SO_3H$ groups in the terminal naphthalene rings in each case independently of one another are in one or more of positions 3, 4 and 6 and $R^1$ and $R^4$ independently of one another represent $C_1$–$C_4$-alkylcarbonyl, benzoyl or benzoyl which is substituted by $C_1$–$C_4$-alkyl, $C_1$–$C_4$-alkoxy $NO_2$ or by a combination of said substituents.

7. Compound according to claim 1, which corresponds to the formula (IV)

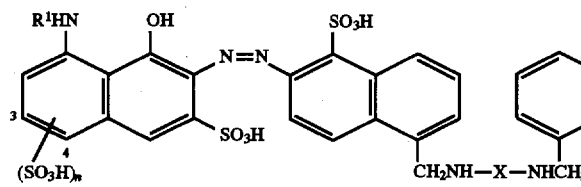
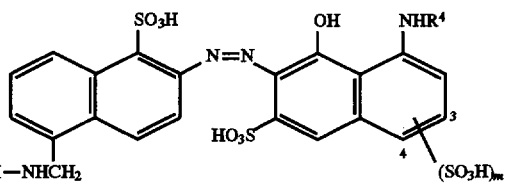

(IV)

wherein the SO₃H group in the terminal naphthalene rings in each case independently of one another is in position 3 or 4.

8. Process for the preparation of a compound according to claim 1, wherein a monoazo dyestuff of the formula (V), in the form of the compound (Va) or (Vb) or a combination of said dyestuffs

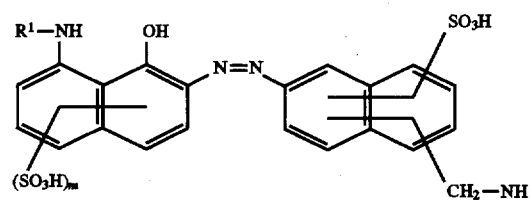

(Va)

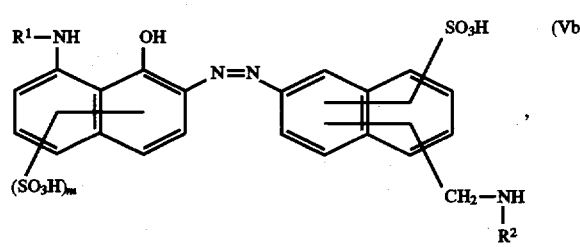

(Vb)

wherein $R^1$ to $R^4$, n and m have the meanings given in claim 1 is reacted with reactive compounds, selected from the group consisting of phosgene, aliphatic, aromatic, carbocyclic, heterocyclic or aromatic-heterocyclic dicarboxylic acids or derivatives thereof the molar ratio of the monoazo dyestuff of the formula (V) to the reactive compound being $\geq 2:1$.

9. Aqueous dyestuff preparation comprising 0.5 to 20% by weight of a dyestuff according to claim 1, 50 to 99.5% by weight of water, organic solvent or water and organic solvent.

10. Process for dyeing and printing a substrate containing hydroxyl groups, amide groups, or both, wherein a compound according to claim 1 is applied.

11. Process according to claim 10 for printing paper by the ink-jet-method.

* * * * *